E. E. LE GRANT.
RIDING ATTACHMENT FOR HARROWS.
APPLICATION FILED FEB. 7, 1916.

1,197,508.

Patented Sept. 5, 1916.
2 SHEETS—SHEET 1.

Witnesses:
Hugh H. Ott

Inventor,
E. E. Le Grant.
By Victor J. Evans
Attorney

E. E. LE GRANT.
RIDING ATTACHMENT FOR HARROWS.
APPLICATION FILED FEB. 7, 1916.
1,197,508.
Patented Sept. 5, 1916.
2 SHEETS—SHEET 2.
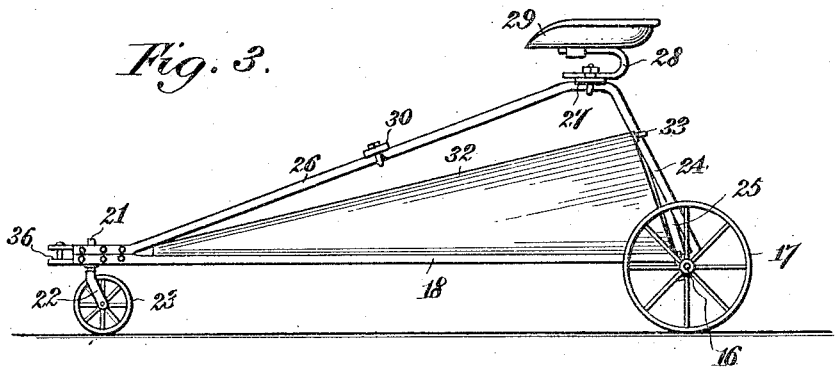
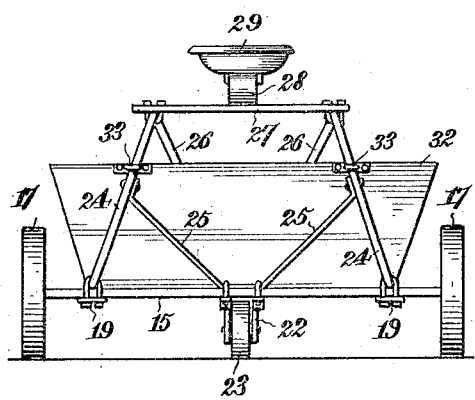 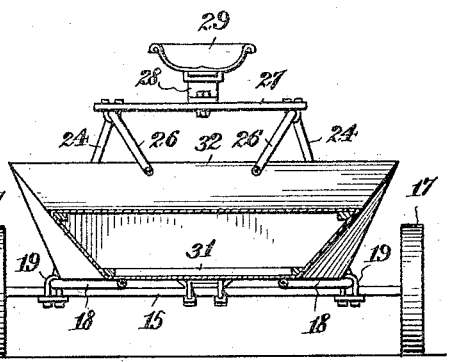
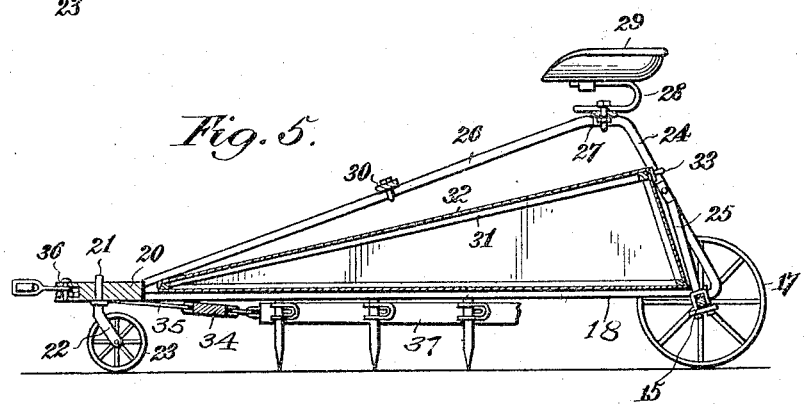
Inventor,
E. E. Le Grant.
Witnesses:
By Victor J. Evans,
Attorney.

UNITED STATES PATENT OFFICE.

ELZY E. LE GRANT, OF SPOKANE, WASHINGTON.

RIDING ATTACHMENT FOR HARROWS.

1,197,508.     Specification of Letters Patent.     Patented Sept. 5, 1916.

Application filed February 7, 1916. Serial No. 76,730.

*To all whom it may concern:*

Be it known that I, ELZY E. LE GRANT, a citizen of the United States, residing at Spokane, in the county of Spokane and State of Washington, have invented new and useful Improvements in Riding Attachments for Harrows, of which the following is a specification.

This invention relates to riding attachments for harrows, sometimes known as harrow carts.

The present invention has for its object to produce a simple and improved riding attachment which may be readily applied to and used in connection with harrows of ordinary construction and which will be light and durable.

A further object of the invention is to produce a cart or riding attachment which will be so constructed that the driver or operator will be seated above a section of the harrow instead of to the rearward thereof, as is usually the case, thereby enabling the operator to have better control of the draft animals.

A further object of the invention is to produce a device to be used in connection with the riding attachment, the same being in the nature of a shield whereby the operator will be protected from the dust rising from the ground when the harrow is in operation.

With these and other ends in view which will readily appear as the nature of the invention is better understood, the same consists in the improved construction and novel arangement and combination of parts which will be hereinafter fully described and particularly pointed out in the claims.

In the accompanyng drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
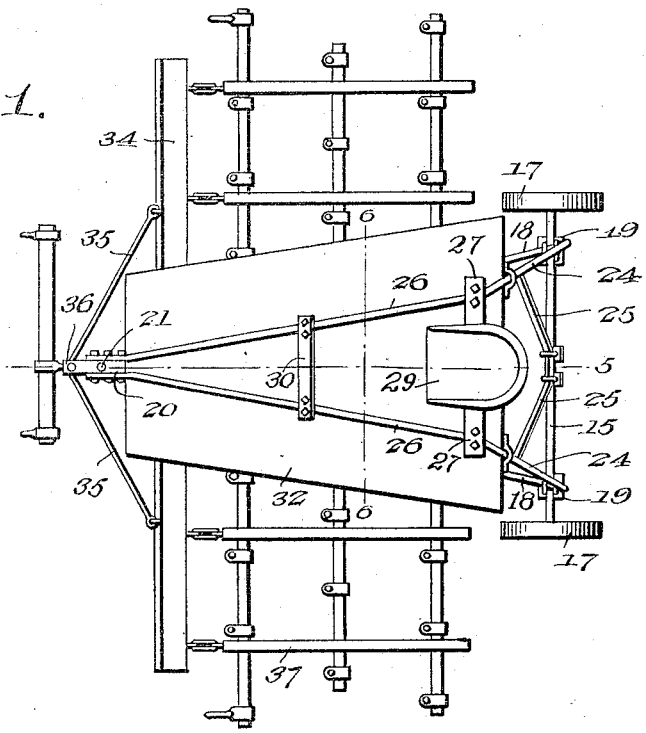
Figure 2:
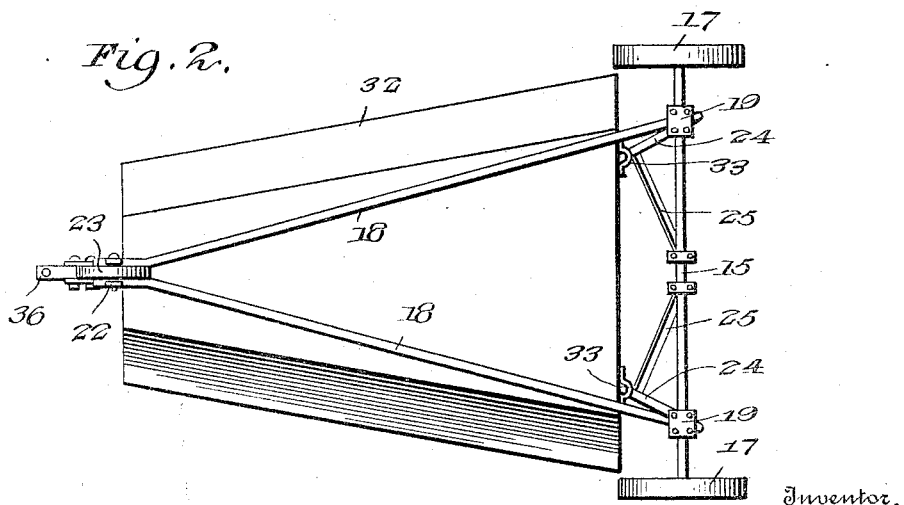

In the drawings,—Figure 1 is a top plan view of a device constructed in accordance with the invention, showing also a portion of the harrow. Fig. 2 is a bottom plan view of the cart without the harrow. Fig. 3 is a side elevation of the cart. Fig. 4 is a rear elevation of the cart. Fig. 5 is a longitudinal sectional view taken on the line 5—5 in Fig. 1. Fig. 6 is a transverse sectional view taken on the line 6—6 in Fig. 1.

Corresponding parts in the several figures are denoted by like characters of reference.

The main axle 15 of the improved riding attachment is equipped with spindles 16 on which the ground wheels 17 are mounted for rotation, said ground wheels being preferably constructed with wide tires so as not to sink readily when the ground is soft. The frame structure of the device includes a pair of forwardly convergent side bars 18, the rear ends of which are supported on the axle where they may be secured by means of clamps 19. The forward ends of the side bars 18 are bolted or otherwise secured on the side faces of a block 20, said block having an aperture wherein is swiveled a shank 21 having at its lower end a fork 22 carrying a caster wheel 23 for convenience in guiding the frame, the forward end of which is supported on said caster wheel. Rising from the rearward ends of the side bars 18 are uprights 24 which are tilted forwardly and also inwardly in the direction of each other, said uprights being reinforced by braces 25 which are connected at their upper ends with the uprights and at their lower ends with the axle intermediate the ends of the latter. The upper ends of the uprights 24 are connected by forwardly convergent top bars 26 with the block 20 with which the forward extremities of said top bars are connected in any convenient manner. It will be observed that while the side bars 18 are disposed in an approximately horizontal plane, the top bars 26 are inclined downwardly and forwardly. At the high ends of said top bars, where they are joined with the upper ends of the uprights 24, they are connected together by a cross bar 27 on which the supporting spring 28 of the seat 29 is mounted. A bar 30 which constitutes a foot rest is connected with the top bars 26 intermediate their upper and lower ends, where such cross bar will conveniently support the feet of the driver. It will be noticed that, the uprights 24 being tilted forwardly, as well as inwardly, the cross bar 27 on which the seat is mounted, will be located well to the forward of the main axle 15.

31 designates a frame which is of a length substantially equal to the length of the frame structure of the cart and of a width preferably exceeding the width of said frame structure. This frame is covered with textile or other material, such as light sheet metal, constituting a dust guard, and said frame is supported at its forward end on the side bars 18 adjacent to the block 20, the rearward end of said frame being connected at 33 with the uprights 24 by means of clamps or connecting devices of any desired construction. The dust guard, it will be seen, will be located between the side bars 18 and the top bars 26, extending to the rearward of the driver's seat. Said dust guard is intended to be of ample area to deflect any dust that may be caused to rise by the operation of the harrow, the dust being deflected to the rearward of the driver who will thus be fully protected from a serious source of annoyance.

In Fig. 1 there has been shown a draft bar 34 provided with brace rods 35, whereby it is connected with the forward portion of the block 20, the latter being equipped with a clevis 36 for the attachment of the draft animals. The harrow sections 37 are connected in the customary manner with the draft bar.

From the foregoing description, taken in connection with the drawings hereto annexed, it will be seen that I have produced a simple, inexpensive and effective riding attachment for harrows which may be readily constructed of light material and in a durable manner. The said attachment also includes a specially constructed dust guard whereby the driver will be amply protected from the annoyance of dust.

Having thus described the invention, what is claimed as new, is:—

1. A harrow cart comprising a main axle having supporting wheels, a front truck including a caster wheel, forwardly converging side bars connecting the axle with the front truck, inwardly and forwardly tilted uprights rising from the axle, top bars connecting the upper extremities of the uprights with the front truck, and a seat supporting cross bar mounted at the high ends of the top bars.

2. A harrow cart comprising a main axle having supporting wheels, a front truck including a caster wheel, forwardly converging side bars connecting the axle with the front truck, inwardly and forwardly tilted uprights rising from the axle, top bars connecting the upper extremities of the uprights with the front truck, a seat supporting cross bar mounted at the high ends of the top bars, and a foot rest mounted on the top bars in advance of the seat.

3. A harrow cart comprising a wheel carrying main axle, a front truck, forwardly convergent side bars connected at their rear ends with the axle and at their front ends with the front truck, and a top frame including top bars supported above the side bars and disposed in a downwardly and forwardly convergent inclined position.

4. A harrow cart comprising a wheel carrying main axle, a front truck, forwardly convergent side bars connected at their rear ends with the axle and at their front ends with the front truck, and a top frame including top bars supported above the side bars and disposed in a downwardly and forwardly convergent inclined position, in combination with a seat supporting cross bar mounted on the top bars at the high ends thereof.

5. A harrow cart comprising a wheel carrying main axle, a front truck, forwardly convergent side bars connected at their rear ends with the axle and at their front ends with the front truck, and a top frame including top bars supported above the side bars and disposed in a downwardly and forwardly convergent inclined position, in combination with a dust guard practically coextensive with the cart and supported intermediate the side bars and the top bars.

6. A harrow cart comprising a wheel carrying main axle, a front truck, forwardly convergent side bars connected at their rear ends with the axle and at their front ends with the front truck, and a top frame including top bars supported above the side bars and disposed in a downwardly and forwardly convergent inclined position, in combination with a dust guard consisting of a frame covered with dust proof material, said frame being positioned intermediate the side bars and the top bars, abutting at its forward end on the juncture of the side bars and top bars with the front truck and connected at its rearward end with uprights rising from the main axle, tilted forwardly and inwardly and connected with the high ends of the top bars.

In testimony whereof I affix my signature in presence of two witnesses.

ELZY E. LE GRANT.

Witnesses:
  LAWRENCE H. BROWN,
  ANDREW E. GALLAGHER.

Copies of this patent may be obtained for five cents each, by addressing the "Commissioner of Patents, Washington, D. C."